June 8, 1965
C. A. OWEN
3,188,071
FLEXURAL PIVOT
Filed Dec. 3, 1962
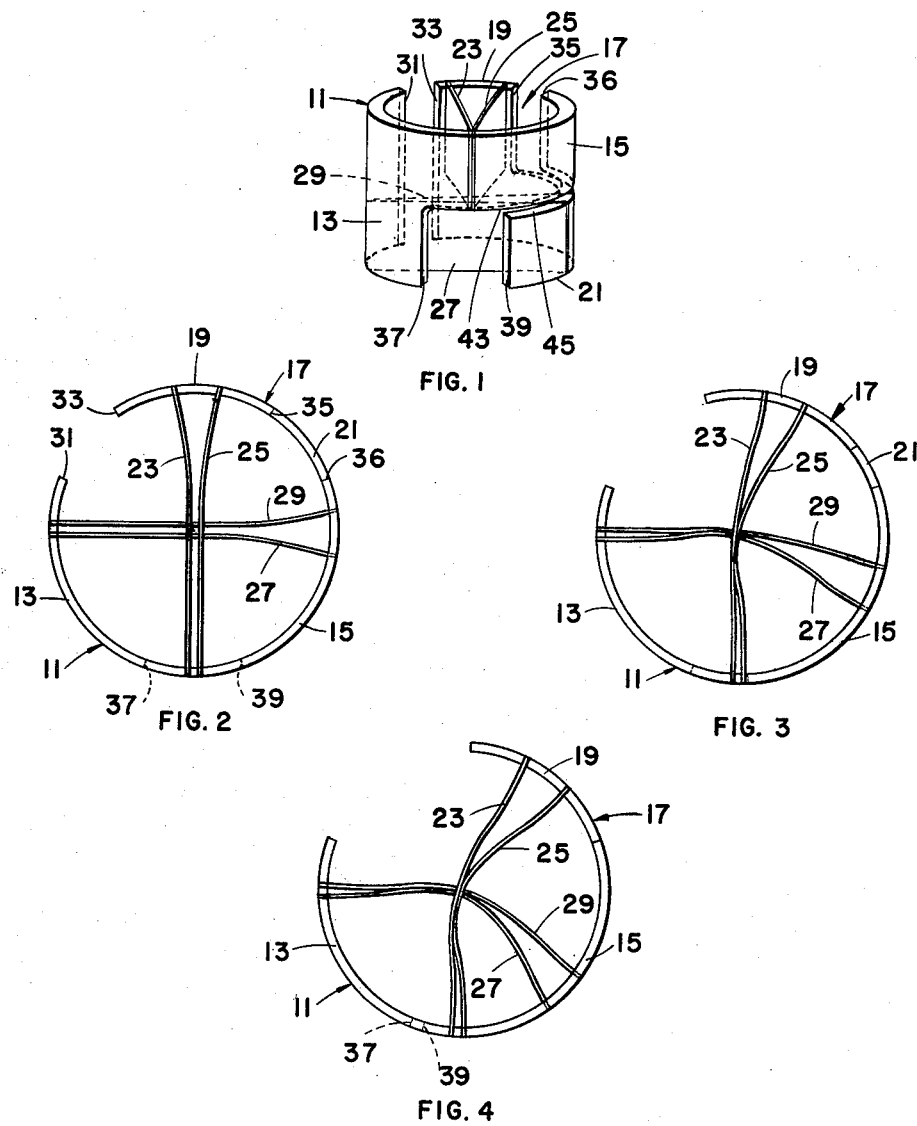
INVENTOR.
CYDWEL A. OWEN
BY Robert W. Ely
ATTORNEY

United States Patent Office 3,188,071
Patented June 8, 1965

3,188,071
FLEXURAL PIVOT
Cydwel A. Owen, Clinton, N.Y., assignor to The Bendix Corporation, Utica, N.Y., a corporation of Delaware
Filed Dec. 3, 1962, Ser. No. 241,985
5 Claims. (Cl. 267—1)

This invention relates to mechanisms which provide limited relative rotation between a stationary element and a movable element and more particularly concerns such mechanisms known as flexural pivots which have crossed flat springs connecting the two elements arranged for relative rotation.

An object of the present invention is to provide an improved flexural pivot in which the axis of rotation is maintained in an improved manner.

Another object is the provision of an improved flexural pivot device in which the radial and axial load capacities are improved for a given flexibility by an arrangement which includes pairs of facing flat springs.

A further object is to provide a flexural pivot device in which flat springs are arranged so that facing springs contact each other upon flexing of the pivot to maintain the axis of rotation.

An additional object is to provide a flexural pivot device in which the crossed spring means are comprised of a first pair of flat springs arranged in facing relation for center contact and a second pair similarly arranged but generally perpendicular to the first pair and in which the springs connect overhanging arcuate elements.

The realization of the above objects along with the features and advantages of the invention will be apparent from the following description and the accompanying drawing in which:

FIGURE 1 is a perspective representation of a flexural pivot embodying the present invention suggesting two flat springs arranged in facing relation above two other facing flat springs which are basically perpendicular to the top springs and shows two similar, curved L-shaped elements connected to the springs for relative rotation.

FIGURE 2 is an end view of the flexural pivot of the present invention and shows two perpendicularly-arranged pairs of springs with each pair having facing surfaces extending parallel and then diverging, FIGURE 3 is a view of the FIGURE 2 flexural pivot after the right element has been rotated relative to the left element and the facing springs have made initial contact, and FIGURE 4 is a view of the FIGURE 2 flexural pivot after full rotation as limited by abutment and shows further contact at the facing surfaces of both pairs of springs.

Referring to FIGURE 1, the left or support element 11 is comprised of an arcuate base section 13 and a curved finger-like projection 15. The right or rotatable element 17 is comprised of an arcuate base section 19 and a curved finger-like projection 21. Both longitudinally-extending elements 11 and 17 and their parts have the same radius and are arranged on a common circle. The far ends of the two top flat springs 23 and 25 are attached by brazing or welding into the top part of base section 19 of the rotatable element 17 while near ends of leaf springs 23 and 25 are similarly attached into the arcuate projection 15 of the stationary or support element 11. Another pair of springs 27 and 29 (having the same flexibility and free length as springs 23 and 25) is similarly connected between base section 13 of support element 11 and projection 21 of rotatable element 17. In the FIGURE 1 representation, it is suggested in an exaggerated manner how the far ends of the upper pair of springs 23 and 25 diverge from each other toward base section 19 and that right ends of springs 27 and 29 likewise diverge (also shown exaggerated) toward projection 21 of the rotatable element 17. The actual arrangement and construction of the diverging springs will be described hereinafter. It is to be noted that the vertically-extending, full-length edge 31 of support element 11 is circumferentially-spaced from the corresponding full-length edge 33 of rotatable element 17. The short half-length edge 35 of rotatable element base section 19 is spaced circumferentially from the axially-extending end edge 36 of projection 15 of support element 11. The short edge 37 of support element 11 is sufficiently spaced from the end edge 39 of the rotatable projection 21 to avoid abutment. The equal spacings at edges 31, 33 and 35, 36 each provide a rotational travel gap or a limit to the relative rotation, as will be described, since abutment will result respectively upon right and left turning of element 17. The range of each rotational travel gap is twenty to forty degrees. A uniform clearance gap is provided between the circumferentially-extending, facing edges 43 and 45 respectively of support projection 15 and rotatable projection 21 so that contact between support element 11 and rotatable element 17 does not occur during rotation.

In FIGURES 2–4, the top or end view of the flexural pivot of the present invention is shown and it can be seen in FIGURE 2 that the actual arrangement of both pairs of springs (23 and 25 and 27 and 29) has the pairs of springs at each side of perpendicular planes through the center or axis of rotation of the flexural pivot. The flat springs 23 and 25 extend closely-spaced and parallel for about half of their length and then gradually diverge or curve with an included angle of about twenty degrees at the ends. Each included angle of the pairs of springs is about one-half of the angle of each rotational travel gap. As mentioned, springs 23 and 25 connect support projection 15 and rotatable base section 19. Springs 27 and 29 have the same arrangement and connect stationary base section 13 and rotatable projection 21. With this overhanging, extended wall structure, a more stable pivot is provided.

It is apparent that axially-extending edges 35 and 36 abut upon clockwise rotation of element 17 (see FIGURE 4) but not edges 37 and 39 and that edges 31 and 33 will abut with counterclockwise rotation. The rotational travel gaps thus provided are each about thirty-six degrees.

In operation, a device which is to be limitedly rotated relative to a fixed support will be suitably attached to rotatable element 17 while support element 11 will be connected to the fixed member. Referring to FIGURES 3 and 4 and assuming clockwise rotation, it is apparent element 17 moves on the common circle and that the vertical pair of springs 23 and 25 and the horizontal pair of springs 27 and 29 begin to touch adjacent the common circle center after rotation (which approximates the included angle at the diverging ends of the springs). After this contact near the geometric center of the pivot, the rotatable element 17 continues to rotate on approximately the geometric center due to the center-directed flexing of the springs. It is to be realized that, after spring 25 contacts its facing spring 23 (which will be straight), spring 25 causes the collapse or flexing of spring 23 away from spring 25. A like action occurs with springs 27 and 29. Counterclockwise rotation gives the same spring action.

It is to be noted that, due to the varying contact between the springs, resonance of the spring system is avoided, hence oscillation at a natural frequency is obviated. Greater deflection with the two pairs of springs for given loading is possible since the required thickness of an equivalent single spring would result in undesirable stressing. Since there is contact at the middle of the springs in each pair and the greater flexed spring prevents (under radial loads) the other spring from straightening out, higher radial loads are possible than is possible with a single flat spring. With the center contact between pairs of springs during pivoting, it is to be again appreciated that rotation is at the geometric center so that shift in the axis of rotation is minimized.

It is to be understood that changes may be made by persons skilled in the art in the disclosed device without departing from the invention as set forth in the following claims.

What I claim is:

1. A flexural pivot comprised of:
   an arcuate rotatable member,
   an arcuate support member positioned opposite said rotatable member,
   a first pair of flat springs extending between and connected to said members and being in facing relation,
   a second pair of flat springs extending between and connected to said members and being in facing relation,
   said pairs of said springs having the same flexibility and free length and being in crossed relation to provide an axis of rotation,
   said members being constructed to provide rotational travel gaps, the springs of each said pair being essentially parallel for about half of their length and then gradually diverging from each other so that said springs contact at the centers thereof closely adjacent said axis of rotation upon rotation of said rotatable member relative to said support member, whereby center shift of the pivot is minimized.

2. A flexural pivot comprised of:
   an arcuate rotatable member,
   an arcuate support member positioned opposite said rotatable member,
   a first pair of flat springs extending between and connected to said members and being in facing relation,
   a second pair of flat springs extending between and connected to said members and being in facing relation,
   said pairs of said springs having the same flexibility and free length and being in crossed relation to provide an axis of rotation,
   said members being constructed to provide rotational travel gaps each in the range of twenty to forty degrees,
   the springs of each said pair being closely spaced and essentially parallel for about half of their length and then gradually diverging from each other to have an included angle of about half of one of said travel gaps so that said springs contact at the centers thereof closely adjacent said axis of rotation upon rotation of said rotatable member relative to said support member, whereby center shift of the pivot is minimized.

3. A flexural pivot comprised of:
   an arcuate rotatable member,
   an arcuate support member positioned opposite said rotatable member,
   said members having the same radius and being arranged on a common circle,
   a first pair of flat springs extending between and connected to said members and being in facing relation,
   a second pair of flat springs arranged generally-perpendicular to said first pair of springs and extending between and connected to said members and being in facing relation,
   said springs having the same flexibility and free length and providing an axis of rotation for said rotatable member, and
   the springs of each said pair extending essentially parallel for about half of their length and then gradually diverging from each other for the remaining half so that said blades contact at the centers thereof closely adjacent said axis of rotation upon rotation of said rotatable member relative to said support member, whereby center shift of the pivot is minimized.

4. The flexural pivot according to claim 3 and being further characterized by:
   said rotatable member having an arcuate base section with a full-length axially-extending edge on one side at the other side a half-length axially-extending edge and a projecting arcuate connecting section,
   said support member having an arcuate base section with a full-length axially-extending extending edge on one side facing the full-length edge of said rotatable member and at the other side a half-length axially-extending edge and a projecting arcuate connecting section axially-opposite the connecting section of said rotatable member,
   said first pair of springs extending between said base section of said rotatable member and said projecting section of said support member,
   said second pair of springs extending between said base section of said support member and said projecting section of said rotatable member, and
   said facing full-length axially-extending edges spaced to provide a first travel gap and said half-length edge of said rotatable member and said connecting section of said support member spaced to provide a second travel gap equal to said first travel gap.

5. The flexural pivot according to claim 4 and being further characterized by:
   said travel gaps being in the range of twenty to forty degrees, and
   each pair of said springs diverging to have an included angle of about half of either travel gap.

References Cited by the Examiner

UNITED STATES PATENTS

| | | | |
|---|---|---|---|
| 2,630,692 | 3/53 | Naugler | 267—1 X |
| 2,674,502 | 4/54 | Faxen | 308—2 |
| 3,073,584 | 1/63 | Troeger | 267—1 |

ARTHUR L. LA POINT, *Primary Examiner.*

R. C. RIORDON, *Examiner.*